US012042071B2

(12) United States Patent
Nguy

(10) Patent No.: US 12,042,071 B2

(45) Date of Patent: Jul. 23, 2024

(54) COLLAPSIBLE CONE TREE

(71) Applicant: Holiday Designs, LLC, Bannockburn, IL (US)

(72) Inventor: Chunwa Nguy, Cornelius, NC (US)

(73) Assignee: Holiday Designs, LLC, Bannockburn, IL (US)

(*) Notice: Subject to any disclaimer, the term of this patent is extended or adjusted under 35 U.S.C. 154(b) by 0 days.

(21) Appl. No.: 18/270,164

(22) PCT Filed: Dec. 6, 2022

(86) PCT No.: PCT/US2022/051936

§ 371 (c)(1),
(2) Date: Jun. 28, 2023

(87) PCT Pub. No.: WO2023/107432

PCT Pub. Date: Jun. 15, 2023

(65) Prior Publication Data

US 2024/0041236 A1 Feb. 8, 2024

Related U.S. Application Data

(60) Provisional application No. 63/286,831, filed on Dec. 7, 2021.

(51) Int. Cl.
*A47G 33/06* (2006.01)
*F21S 4/10* (2016.01)

(52) U.S. Cl.
CPC ................ *A47G 33/06* (2013.01); *F21S 4/10* (2016.01)

(58) Field of Classification Search
CPC ..................................................... A47G 33/06
See application file for complete search history.

(56) References Cited

U.S. PATENT DOCUMENTS

| | | | | |
|---|---|---|---|---|
| 3,846,213 A | | 11/1974 | Thiemann | |
| 5,758,948 A | * | 6/1998 | Hale | A47G 33/06 362/123 |
| 6,162,515 A | * | 12/2000 | Hill | A47G 33/06 428/20 |

(Continued)

OTHER PUBLICATIONS

International Search Report issued by ISA/EPO in connection with PCT/US2022/051936 dated Jun. 15, 2023.

(Continued)

*Primary Examiner* — Mark Ruthkosky
*Assistant Examiner* — Julia L Rummel
(74) *Attorney, Agent, or Firm* — Levenfeld Pearlstein, LLC

(57) ABSTRACT

A collapsible cone tree includes a mast (12), abase plate (14) mounted to an end of the mast and a plurality of legs (18), each having a first end pivotally mounted to the base plate and a free end, a plurality of struts (20), each having a first end pivotally mounted to a respective one of the legs intermediate the first end and the free end. A support member (12,24) is slidably positioned on the mast, and the second end of each strut is pivotally mounted to the support member. The support member is moved away from the base plate to collapse the legs toward the mast to a closed state, and is moved toward the base plate to open the legs away from the mast to an open state. Flexible stringers, such as LED light strings extend between the legs' free ends and a top of the mast.

22 Claims, 4 Drawing Sheets

(56) References Cited

U.S. PATENT DOCUMENTS

| | | | | |
|---|---|---|---|---|
| 7,984,884 | B1 | 7/2011 | Iliev | |
| 2005/0260360 | A1 * | 11/2005 | Rahman | A47G 33/06 428/18 |
| 2008/0283717 | A1 * | 11/2008 | Kim | A41G 1/007 248/524 |
| 2014/0233221 | A1 * | 8/2014 | Tsai | A47G 33/06 362/123 |
| 2021/0298400 | A1 | 9/2021 | Suber | |

OTHER PUBLICATIONS

Written Opinion ssued by ISA/EPO in connection with PCT/US2022/051936 dated Jun. 15, 2023.

* cited by examiner

COLLAPSIBLE CONE TREE

BACKGROUND

The following description generally relates to a cone tree, so as to resembling a Christmas tree, and more particularly, to an artificial collapsible cone tree.

FIGS. 1A and 1B illustrate typical artificial or string-light trees 1A and 1B. These trees require considerable amount of space for storage. The bases or stands 2A and 2B for such trees 1A and 1B are large circular members typically made from steel or aluminum and can be as large as 36 or 48 inches or more in diameter. This can be disadvantageous, especially in smaller home, apartments and the like that have limited storage space.

Although some stands 2A and 2B can be broken down into parts, the parts can be as large as the erected diameter, that is 36 inches, 48 inches or more. Storage of these large and cumbersome members during the eleven months that the tree 1A and 1B is in storage may be difficult.

Accordingly, there is a need for an artificial tree having an incorporated stand that is collapsible for easy storage, which stand has a large diameter base area for stability.

SUMMARY

In an aspect, a collapsible cone tree includes a mast, a base plate mounted to an end of the mast, a plurality of legs and a plurality of struts, and a support member slidably positioned on the mast.

Each leg has a first end pivotally mounted to the base plate and an opposite free end, and each strut has a first end pivotally mounted to a respective one of the plurality of legs intermediate the first end and the free end. Each strut has a second end, each pivotally mounted to the support member.

The support member is moved away from the base plate to collapse the legs toward the mast to a closed state, and is moved toward the base plate to open the legs away from the mast to an open state.

In an embodiment, the cone tree further includes a locking member to lock the cone tree in the open state. The locking member can include a biased button mounted in the mast and a cooperating opening in the sleeve such that when in the open state, the button extends into the opening.

In embodiments, the support member includes a sleeve and a strut plate. The sleeve is slidably positioned on the mast and the strut plate is fixedly mounted to the sleeve.

In an embodiment the legs are pivotally mounted to the base plate by a ring-shaped pivot pin, and in en embodiment 1, the struts are pivotally mounted to the support member by a ring-shaped pivot pin. In the open state, the free ends of the legs define a plane, and the mast is perpendicular to the plane.

In embodiments, the cone tree further includes a plurality of flexible stringers extending between the legs' free ends and a top of the mast. In embodiments, the flexible stringers are LED light strings. The LED light strings can be attached to the legs' free ends by biasing elements, such as coil springs. The flexible stringers can be mounted to the top of the mast at a receiver.

In embodiments the height of the mast is variable. The mast can be formed of multiple sections. The multiple sections can be telescopic.

In another aspect a collapsible cone tree includes a telescopic mast having a top, a base plate mounted to an opposite end of the mast, a plurality of legs, each having a first end pivotally mounted to the base plate and an opposite free end, a plurality of struts, each having a first end pivotally mounted to a respective one of the plurality of legs intermediate the first end and the free end, and having a second end. The cone tree further includes a sleeve slidably positioned on the mast, and a strut plate fixedly mounted to the sleeve for sliding movement with sleeve. The second end of each strut is pivotally mounted to the strut plate.

A plurality of flexible stringers extends between the legs' free ends and the mast top. The sleeve and strut plate are moved away from the base plate to collapse the legs toward the mast to a closed state, and the sleeve and strut plate are moved toward the base plate to open the legs away from the mast to an open state. The mast is deployed to extend the stringers so as to form the artificial cone tree.

In embodiments, the cone tree further includes a locking member having a biased button mounted in the mast and a cooperating opening in the sleeve, such that in the open state, the button extends into the opening to lock the cone tree in the open state.

In embodiments, the legs are pivotally mounted to the base plate by a ring-shaped pivot pin and/or the struts are pivotally mounted to the strut plate by a ring-shaped pivot pin.

In the open state, the free ends of the legs define a plane, and the mast is perpendicular to the plane. In embodiments, the free ends of the legs include eyelets and the stringers are mounted to the eyelets by biasing elements.

Other objects, features, and advantages of the disclosure will be apparent from the following description, taken in conjunction with the accompanying sheets of drawings, wherein like numerals refer to like parts, elements, components, steps, and processes.

DETAILED DESCRIPTION

Figure 1A:
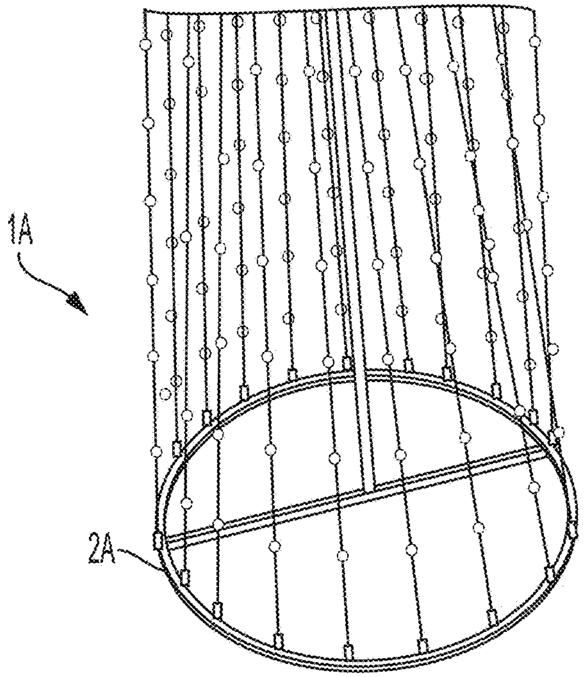
FIG. 1A PRIOR ART
FIGS. 1A and 1B illustrate known string-light trees and show the tree stands or bases.
Figure 1B:
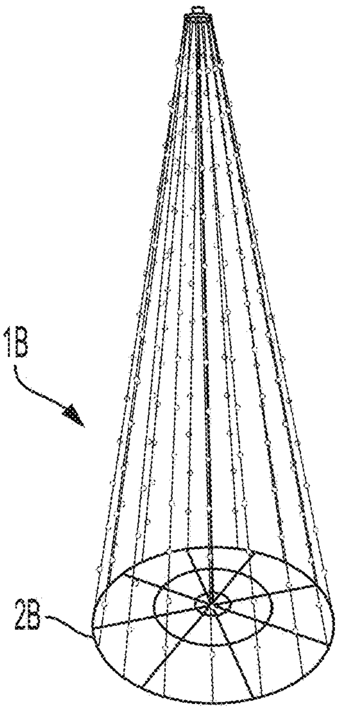
FIG. 1B PRIOR ART

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Figure 2:
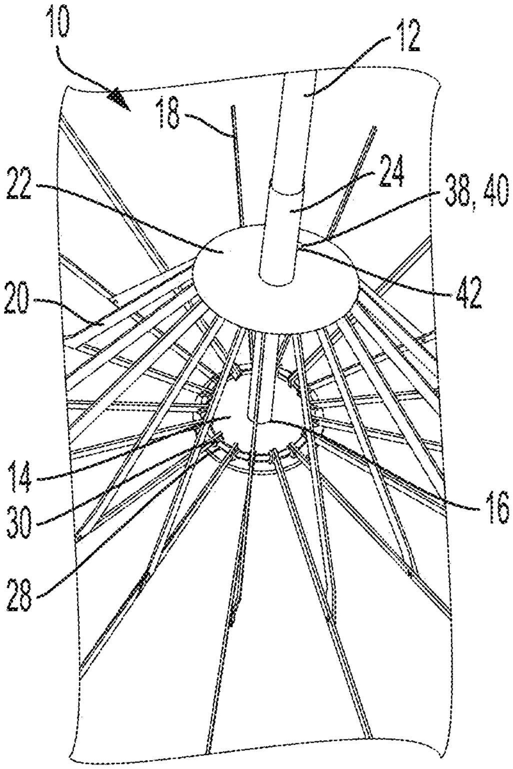
FIG. 2 is a partial view of an embodiment of a collapsible tree stand showing the upper and lower base plates, legs, and leg struts.
Figure 3:
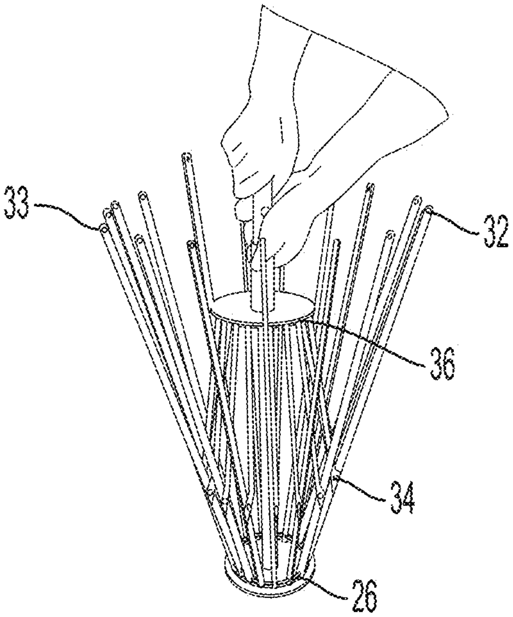
FIG. 3 illustrates the stand in a partially collapsed state, in the beginning stages of being opened.
Figure 4:
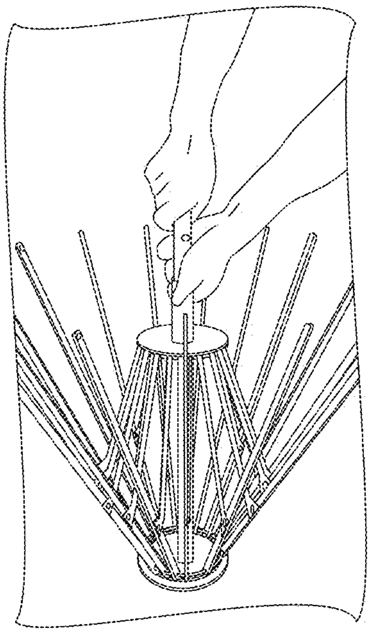
FIG. 4 illustrates the stand in a further state of being opened.
Figure 5:
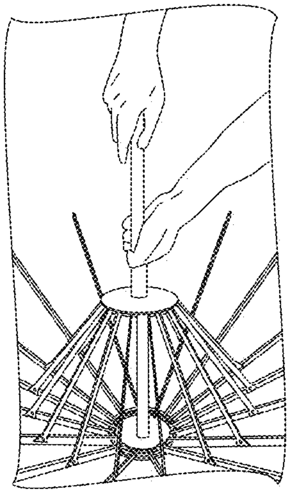
FIG. 5 illustrates the stand in still a further state of being opened.

FIG. 2 illustrates an embodiment of a stand 10 for a collapsible cone tree. The tree 11 is illustrated schematically in FIG. 7. The stand 10 includes a main pole or mast 12, a base plate 14 mounted to an end 16 of the mast 12, a plurality of legs 18 pivotally mounted to the base plate 14, a plurality of struts 20, each associated with and pivotally mounted to a respective one of the legs 18, a strut plate 22 to which the struts 20 are pivotally mounted, and a sleeve 24 slidably positioned on the mast 12 and mounted to strut plate 22.

Figure 6:
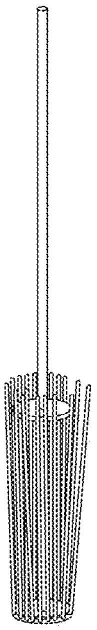
FIG. 6 illustrates the stand with the base in a fully collapsed state and the mast partially extended.
Figure 7:
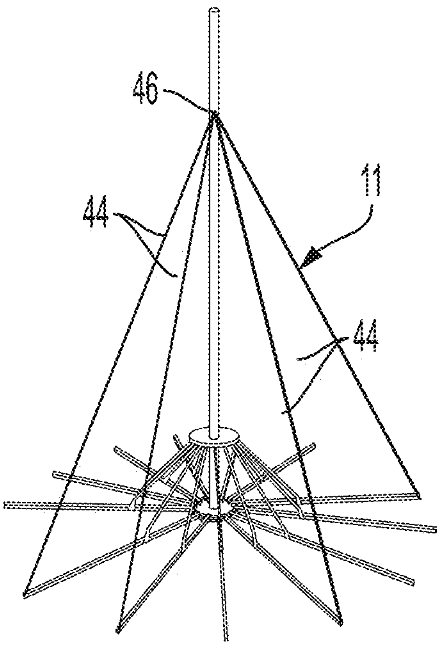
FIG. 7 illustrates the stand with the base fully deployed and the mast partially extended, and further showing the stingers extending between a number of the legs' free ends and the top of the mast.
Figure 8:
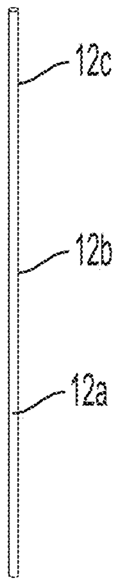
FIG. 8 shows the mast fully extended.

The mast 12 is the main support that forms the tree 11. Referring briefly to FIGS. 6-8, the mast 12 is formed in sections, for example, sections 12*a*, 12*b*, 12*c*, that telescope to a predetermined height. In a current embodiment the overall height of the stand 10 (the mast 12) is about 8 feet.

The base plate 14 is fixedly mounted to an end 16 of the mast 12. In a current embodiment, the base plate 14 is round and the mast 12 is mounted to the center of the base plate 14. The legs 18 are pivotally mounted at one end 26 to the base plate 14 inwardly of an outer periphery of the plate 14. In the illustrated embodiment, a ring-shape pivot pin 28 is mounted to the base plate 14 by a series of eye mounts 30 and the legs 18 are pivotally mounted to the pivot pin 28. An opposite end of each leg defines a free end 32. The free ends 32 each include an opening or eyelet 33.

One end 34 of each strut 20 is pivotally mounted to a respective leg 18 intermediate the base end pivot 26 and the free end 32. The other end 36 of each strut 20 is pivotally mounted to the strut plate 22. In a current embodiment, although not visible in the figures, a second ring-shape pivot pin is mounted to the struct plate by a series of eye mounts and the struts are pivotally mounted to the second pivot pin in a manner similar to the leg (first) ring-shaped pivot pin and the second pivot pin is likewise mounted to the strut plate by a series of eye mounts.

The strut plate 22 is fixedly mounted to the sleeve 24. In a current embodiment, the sleeve 24 fits over and slides along the mast 12. The strut plate 22 is mounted to the sleeve 24 between ends of the sleeve. The mast 12 can include locking members 38 that cooperate with the sleeve 24 to lock the stand 10 in one or both of the open and closed positions. In a current embodiment the locking members 38 include biased buttons 40 in the mast 12 that insert into openings 40 in the sleeve 24. FIG. 2 shows the button 40 in place in the opening 42 when the stand 10 is in the fully open state. Alternately, the locking members can include a threaded member (not shown), such as a threaded shank mounted to a handle and threads in the opening 42 which is threaded to accept the threaded member.

Figure 9:
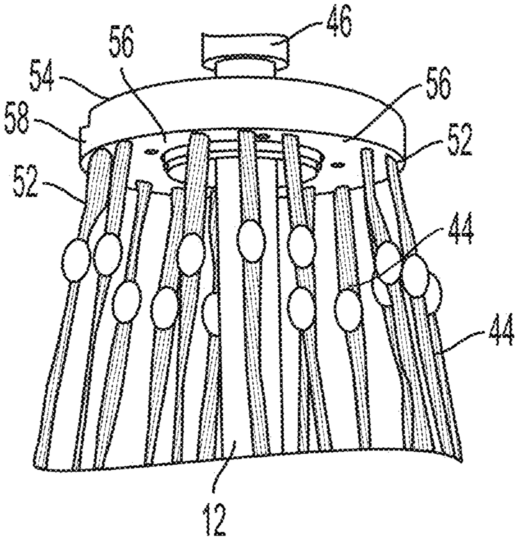
FIG. 9 is a partial enlarged view of the light string receiver mounted about the top of the mast.
Figure 10:
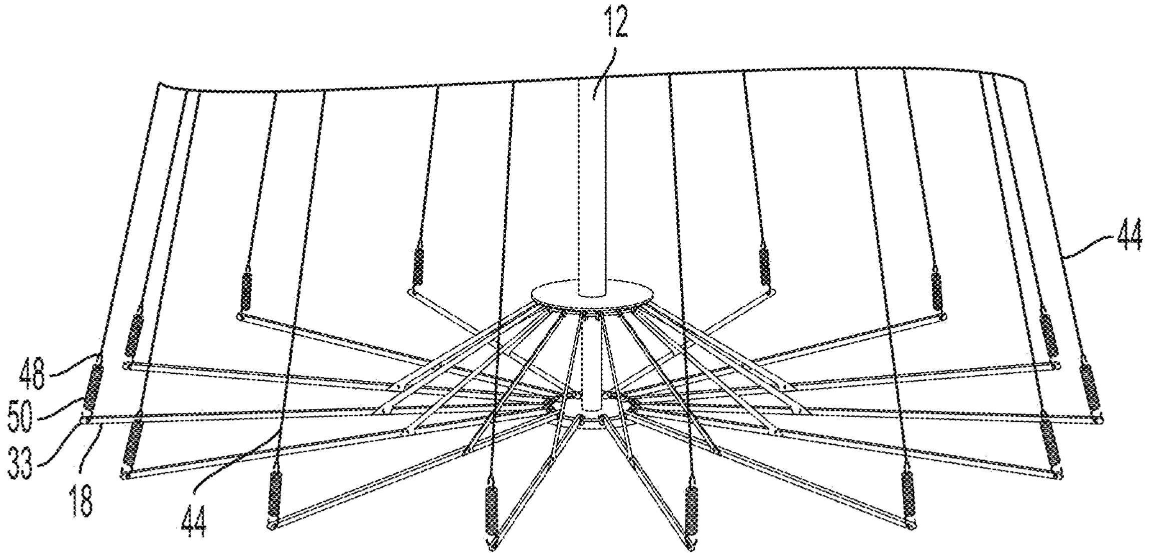
FIG. 10 is a partial enlarged view of the base of tree stand fully opened and illustrating the light string mounting to the legs of the base.

Stringers 44 extend between the eyelets 33 and the top 46 of the mast 12. Referring to FIGS. 9 and 10, in a current embodiment, the stringers 44 are string lights, such as flexible LED string lights. One end 48 of the string lights 44 are mounted to the legs 18, at the openings or eyelets 33 by, for example a biasing member such as the illustrated coil spring 50. The other end 52 of the string lights 44 are mounted to a receiver 54 at about the top 46 of the mast 12. The receiver 54 provides for support, securement and return bending of the string lights 44. In a current embodiment, the receiver 54 has a donut-like shape with the string lights inserting into the receiver through openings 56 spaced about the periphery 58 of the receiver. A power supply and conductor (not shown) and controller (not shown) are also provided to provide power and control of the string lights. The power supply, electrical connections and controller will be recognized by those skilled in the art. Alternately or in combination with the string light stringers 44, other flexible elements that fold can be used and can be made to resemble, for example, a pine (Christmas) tree limb having artificial needles, pine cones and the like.

In use, in the closed state, the legs 18 are folded toward the mast 12 and the struts 20 are pivoted inwardly so as to collapse toward the legs 18. The mast 12 is in the collapsed state. The bottom ends 48 of the string lights 44 are separated/removed from the coil springs 50 and/or the coil springs 50 are removed from the eyelets 33 so that the string lights 44 are rolled or folded for storage, but remain connected to the trees stand 10 by the receiver 54.

Referring to FIGS. 3-8, the stand is shown in the process of being opened. As the sleeve 24 is slid or urged toward the base plate 14, the struts 20 and legs 18 pivot outwardly. As the legs 18 are in the final, open state (again, referring to FIGS. 2 and 7) the biased button 40 on the mast 12 locks into the opening 42 in the sleeve 24 to lock the legs 18 in the open state. In this state, the leg free 32 ends define a plane with the mast 12 perpendicular to the plane. The mast 12 is then deployed or extended to its full height. Once the mast 12 is deployed the stringers can be unfold or uncoiled and mounted to the legs 18 at the eyelets 33 by the coils springs 50. In this way, the string lights remain in tension to provide a clean and aesthetically pleasing appearance.

The illustrated tree stand 10 is shown with sixteen legs 18 and 16 corresponding struts 20. It will be appreciated that a greater number of legs increases the stability of the stand. It will, however, also be appreciated that the stand will function with three legs, in that the three free ends of the legs will define a plane such the mast can extend perpendicular to the plane for proper support of the tree. Of course, the stand can have any number of legs greater than three, so long as the free ends of the legs define a mast-perpendicular plane when the stand is in the open state.

An advantageous feature of the stand (in addition to its small size when in the closed or collapsed state) is that when it is in the open state, the legs have a wide stance or broad base for balance and stability, and a low profile relative to the floor. The low profile permits readily covering and/or decorating the base such that it is an integral, yet inconspicuous part of the overall holiday environment.

It is understood that the features from any of the embodiments described herein may be combined with, or replace features of other embodiments described herein, without deviating from the scope of this disclosure.

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. An artificial tree comprising a collapsible cone tree, the collapsible cone tree comprising:

a mast having a top;

a base plate mounted to an end of the mast opposite the top;

a plurality of legs, each having a first end pivotally mounted to the base plate and an opposite free end;

a plurality of struts, each strut having a first end pivotally mounted to a respective one of the plurality of legs intermediate the first end and the free end, each strut having a second end;

a support member slidably positioned on the mast, the second end of each strut being pivotally mounted to the support member; and a plurality of flexible stringers extending between the legs' free ends and the mast top;

wherein the support member is moved away from the base plate to collapse the legs toward the mast to a closed state, and wherein the support member is moved toward the base plate to open the legs away from the mast to an open state, thereby extending the stringers so as to form the artificial tree with a cone shape.

2. The artificial tree claim 1, further including a locking member to lock the cone tree in the open state.

3. The artificial tree of claim 2, wherein the locking member includes a biased button mounted in the mast and a cooperating opening in the sleeve, wherein in the open state, the button extends into the opening.

4. The artificial tree of claim 1, wherein the support member includes a sleeve and a strut plate.

5. The artificial tree of claim 4, wherein the sleeve is slidably positioned on the mast and the strut plate is fixedly mounted to the sleeve.

6. The artificial tree of claim 1, wherein the legs are pivotally mounted to the base plate by a ring-shaped pivot pin.

7. The artificial tree of claim 1, wherein the struts are pivotally mounted to the support member by a ring-shaped pivot pin.

8. The artificial tree of claim 7, wherein the support member includes a sleeve and a strut plate and wherein the struts are pivotally mounted to the strut plate by a ring-shaped pivot pin.

9. The artificial tree of claim 1, wherein, in the open state, the free ends of the legs define a plane, and wherein the mast is perpendicular to the plane.

10. The artificial tree of claim 1, wherein the flexible stringers are LED light strings.

11. The artificial tree of claim 10, wherein the LED light strings are attached to the legs' free ends by biasing elements.

12. The artificial tree of claim 1, wherein a height of the mast is variable.

13. The artificial tree of claim 1, wherein the mast is formed of multiple sections.

14. The artificial tree of claim 13, where in the multiple sections are telescopic.

15. The artificial tree of claim 1, wherein the flexible stringers are mounted to the top of the mast at a receiver.

16. An artificial tree comprising a collapsible cone tree, the collapsible cone tree comprising:

a telescopic mast having a top;

a base plate mounted to an end of the mast opposite the top;

a plurality of legs, each having a first end pivotally mounted to the base plate and an opposite free end;

a plurality of struts, each strut having a first end pivotally mounted to a respective one of the plurality of legs intermediate the first end and the free, each strut having a second end;

a sleeve slidably positioned on the mast;

a strut plate, the strut plate fixedly mounted to the sleeve for sliding movement with sleeve, the second end of each strut being pivotally mounted to the strut plate; and a plurality of flexible stringers extending between the legs' free ends and the mast top;

wherein the sleeve and strut plate are moved away from the base plate to collapse the legs toward the mast to a closed state, wherein the sleeve and strut plate are moved toward the base plate to open the legs away from the mast to an open state, and wherein the mast is deployed to extend the stringers so as to form the artificial tree with a cone shape.

17. The artificial tree of claim 16, including at least 3 legs and correspondingly at least 3 struts.

18. The artificial tree of claim 16, further including a locking member having a biased button mounted in the mast and a cooperating opening in the sleeve, wherein in the open state, the button extends into the opening to lock the cone tree in the open state.

19. The artificial tree of claim 16, wherein the legs are pivotally mounted to the base plate by a ring-shaped pivot pin.

20. The artificial tree of claim 16, wherein the struts are pivotally mounted to the strut plate by a ring-shaped pivot pin.

21. The artificial tree of claim 16, wherein, in the open state, the free ends of the legs define a plane, and wherein the mast is perpendicular to the plane.

22. The artificial tree of claim 16, wherein the free ends of the legs include eyelets and wherein the stringers are mounted to the eyelets by biasing elements.

* * * * *